US012615344B2

(12) United States Patent
Kwon et al.

(10) Patent No.: US 12,615,344 B2
(45) Date of Patent: Apr. 28, 2026

(54) SINK DEVICE AND OPERATING METHOD THEREOF

(71) Applicant: LG ELECTRONICS INC., Seoul (KR)

(72) Inventors: Ohkyu Kwon, Seoul (KR); Heechen Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/807,184

(22) Filed: Aug. 16, 2024

(65) Prior Publication Data

US 2025/0343875 A1 Nov. 6, 2025

(30) Foreign Application Priority Data

May 2, 2024 (KR) ........................ 10-2024-0058576

(51) Int. Cl.
*H04N 7/035* (2006.01)
*G06F 3/14* (2006.01)
*H04N 7/015* (2006.01)

(52) U.S. Cl.
CPC .......... *H04N 7/0352* (2013.01); *H04N 7/015* (2013.01); *G06F 3/14* (2013.01)

(58) Field of Classification Search
CPC ......... H04N 7/0352; H04N 7/015; G06F 3/14
See application file for complete search history.

(56) References Cited

U.S. PATENT DOCUMENTS 10,341,598 B1 * 7/2019 Senapati ................ H04N 21/47
2012/0281069 A1 * 11/2012 Nishio ................ H04N 13/161 348/E13.001
2021/0136322 A1 * 5/2021 Zhao .................. H04N 21/4402
2022/0345773 A1 * 10/2022 Choi ...................... H04N 21/84
2024/0221702 A1 * 7/2024 Yamamoto .............. G09G 5/36

* cited by examiner

*Primary Examiner* — Michael E Teitelbaum
(74) *Attorney, Agent, or Firm* — LEE, HONG, DEGERMAN, KANG & WAIMEY

(57) ABSTRACT

The sink device according to an embodiment of the present disclosure comprises a memory configured to store a mapping table, an external device interface configured to receive a video signal from a source device through HDMI (High-Definition Multimedia Interface) standard and a controller configured to obtain a horizontal total value, a vertical total value, and an output frequency based on the video signal, obtain a pixel clock frequency mapped to the horizontal total value, the vertical total value, and the output frequency from the mapping table, and output the video signal based on the obtained pixel clock frequency.

14 Claims, 6 Drawing Sheets

FIG. 3C

1. AVI - VIC info: 93(24Hz)
2. VSIF - VIC info: 0x03(24Hz)
3. Frequency: 24Hz

500

| Index | PCLK(MHz) | HTOTAL | VTOTAL | Frame rate(Hz) | Tolerance(%) | PCLK Tol(MHz) |
|---|---|---|---|---|---|---|
| 1 | 1332.75 | 3840 + 160 | 2160 + 154 | 144 | 125 ~ 155Hz | 1152 ~ 1435 |
| 2 | 604.25 | 2560 + 160 | 1440 + 103 | 144 | 125 ~ 155Hz | 524.6 ~ 650.5 |
| 3 | 346.5 | 1920 + 160 | 1080 + 77 | 144 | 125 ~ 155Hz | 300.8 ~ 373.0 |
| ... | ... | ... | | | | |

SINK DEVICE AND OPERATING METHOD THEREOF

CROSS-REFERENCE TO RELATED APPLICATION

Pursuant to 35 U.S.C. § 119 (a), this application claims the benefit of earlier filing date and right of priority to Korean Patent Application No. 10-2024-0058576, filed on May 2, 2024, the contents of which are all hereby incorporated by reference herein in its entirety.

BACKGROUND OF THE INVENTION

1. Field of the Invention

This disclosure relates to a sink device, and more specifically, to a sink device that receives a signal from a source device through the HDMI standard.

2. Discussion of the Related Art

HDMI (High-Definition Multimedia Interface) is one of the uncompressed digital video/audio interface standard. A sink device, such as a display device, receives video/audio signals from the source device through the HMDI standard.

When receiving a signal from a source device through the HDMI standard, the video output is delayed by 2 to 3 seconds under the input conditions of a DTD (Detailed Timing Descriptor) timing signal that is not defined in the CTA (Consumer Technology Association). do.

This is because the time it takes for the sink device to check video identification code (VIC) information and, if VIC information does not exist, the time it takes to calculate the pixel clock frequency.

Accordingly, the display of video output from the source device may be delayed, causing inconvenience to the user's viewing experience.

SUMMARY OF THE INVENTION

The purpose of the present disclosure may be to shorten the output timing of video when receiving a DTD (Detail Timing Descriptor) timing signal from a source device through the HDMI standard.

The purpose of the present disclosure may be to output video without output deviation when receiving a DTD (Detail Timing Descriptor) timing signal from a source device through the HDMI standard.

The purpose of the present disclosure may be to eliminate inconvenience in using the product by minimizing video output delay when receiving a DTD (Detail Timing Descriptor) timing signal from a source device through the HDMI standard.

A sink device according to an embodiment of the present disclosure comprises a memory configured to store a mapping table, an external device interface configured to receive a video signal from a source device through HDMI (High-Definition Multimedia Interface) standard and a controller configured to obtain a horizontal total value, a vertical total value, and an output frequency based on the video signal, obtain a pixel clock frequency mapped to the horizontal total value, the vertical total value, and the output frequency from the mapping table, and output the video signal based on the obtained pixel clock frequency.

An operating method of a sink device according to an embodiment of the present disclosure comprises storing a mapping table, receiving a video signal from a source device through High-Definition Multimedia Interface (HDMI) standard, obtaining a horizontal total value, a vertical total value, and an output frequency based on the video signal, obtaining a pixel clock frequency mapped to the horizontal total value, the vertical total value, and the output frequency from the mapping table, and outputting the video signal based on the obtained pixel clock frequency According to an embodiment of the present disclosure, the sink device can quickly obtain the pixel clock frequency of the video through the mapping table once only the horizontal total value, vertical total value, and frame rate are confirmed. Accordingly, the output delay time of video received from the source device can be significantly reduced.

According to an embodiment of the present disclosure, video can be output without output deviation under the input conditions of a DTD (Detail Timing Descriptor) timing signal.

BRIEF DESCRIPTION OF THE DRAWINGS

FIG. 3C is a diagram illustrating the sequence for confirming the output frequency of the video.

DETAILED DESCRIPTION OF THE PREFERRED EMBODIMENTS

Figure 1:
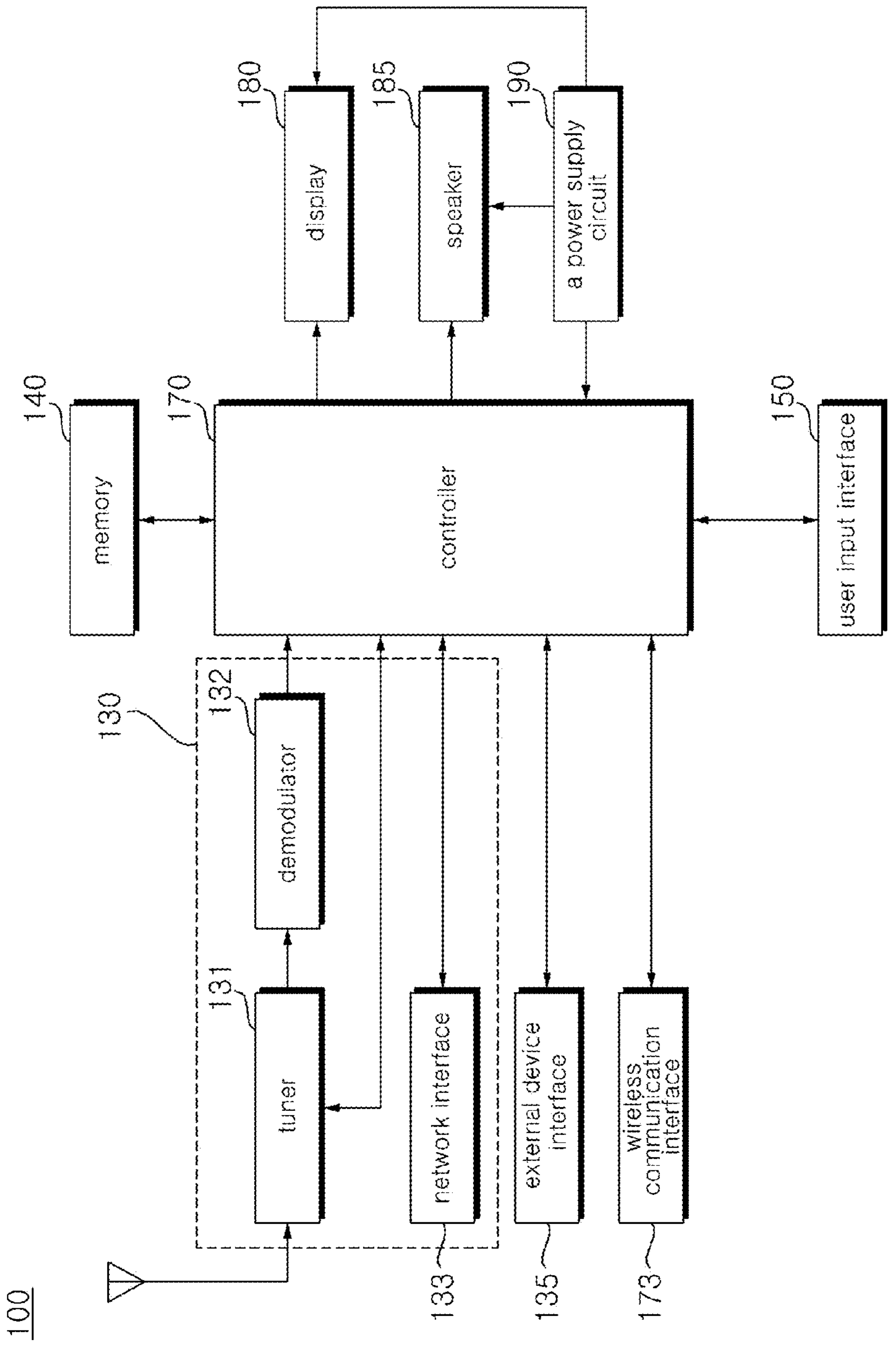
FIG. 1 is a block diagram showing the configuration of a display device according to an embodiment of the present invention.

Hereinafter, the present disclosure will be described in more detail with reference to the drawing.

Hereinafter, embodiments of the present disclosure will be described in detail with reference to the drawings. The suffixes "module" and "unit or portion" for elements used in the following description are merely provided only for facilitation of preparing this specification, and thus they are not granted a specific meaning or function.

The display device according to an embodiment of the present disclosure is, for example, an intelligent display device in which a computer support function is added to a broadcast reception function, and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games may also be performed. A standardized general-purpose OS may be used for these various functions.

Accordingly, in the display device described in the present disclosure, various user-friendly functions may be performed because various applications may be freely added or deleted, for example, on a general-purpose OS kernel. More specifically, the display device may be, for example, a network TV, HBBTV, smart TV, LED TV, OLED TV, and the like, and may be applied to a smart phone in some cases.

FIG. 1 is a block diagram showing a configuration of a display device according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiving unit 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into an image signal, an audio signal, and a data signal related to a broadcast program, and restore the separated image signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of images and audio output from an external device connected to the display device 100 in a wired or wireless manner, and transmit the same to the controller 170. The external device interface 135 may include a plurality of external input terminals. The plurality of external input terminals may include an RGB terminal, one or more High Definition Multimedia Interface (HDMI) terminals, and a component terminal.

The image signal of the external device input through the external device interface unit 135 may be output through the display 180. The audio signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, it is possible to access a predetermined web page through a network, and transmit or receive data to or from a corresponding server.

In addition, the network interface 133 may receive content or data provided by a content provider or a network operator. That is, the network interface 133 may receive content such as movies, advertisements, games, VOD, and broadcast signals and information related thereto provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store images, audio, or data signals, which have been subjected to signal-processed.

In addition, the memory 140 may perform a function for temporarily storing images, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device in accordance with various communication methods, such as a Bluetooth communication method, a WB (Ultra Wideband) communication method, a ZigBee communication method, an RF (Radio Frequency) communication method, or an infrared (IR) communication method or may perform processing to transmit the control signal from the controller 170 to the remote control device.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The audio signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or audio signal.

In addition, the controller 170 may output an image signal or an audio signal through the display 180 or the speaker 185, according to a command for playing back an image of an external device through the user input interface 150, the image signal or the audio signal being input from an external device, for example, a camera or a camcorder, through the external device interface 135.

Meanwhile, the controller 170 may allow the display 180 to display an image, for example, allow a broadcast image which is input through the tuner 131 or an external input image which is input through the external device interface 135, an image which is input through the network interface unit or an image which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast image, an external input image, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the illustrated elements may be integrated, added, or omitted depending on the specification of the display device 100 that is actually implemented.

That is, two or more elements may be combined into one component, or one component may be divided into two or more elements as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content play back device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content play back device including the display 180 the speaker 185.

Figure 2:
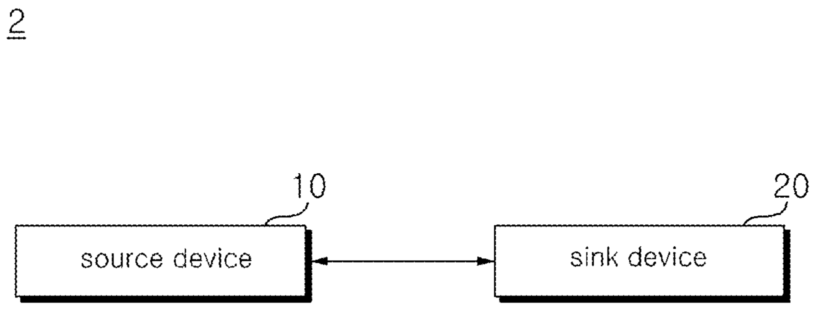
FIG. 2 is a diagram illustrating the configuration of an HDMI system according to an embodiment of the present disclosure.

FIG. 2 is a diagram illustrating the configuration of an HDMI system according to an embodiment of the present disclosure.

The HDMI system 2 may include a source device 10 and a sink device 20.

The source device 10 may transmit a signal to the sink device 20 through the High Definition Multimedia Interface (HDMI) standard. Specifically, the source device 10 may transmit an output signal to the sink device 20 under FRL (Fixed Rate Link) mode through the HMDI 2.1 standard.

The sink device 20 may output a signal received from the source device 10.

The display device 100 of FIG. 1 is an example of a sink device 20. The sink device 20 may include all components of the display device 100.

The source device 10 may be connected to the sink device 20 through an HDMI cable.

The source device 10 may be an external device such as a set-top box, game console, laptop, or smartphone.

The sink device 20 may be an electronic device such as a display device 100, a smart pad, a smartphone, or a PC.

Hereinafter, it is assumed that output frequency of the video is the same as the frame rate. The frame rate may indicate the number of video frames output to the display 180 per second.

Figure 3A:
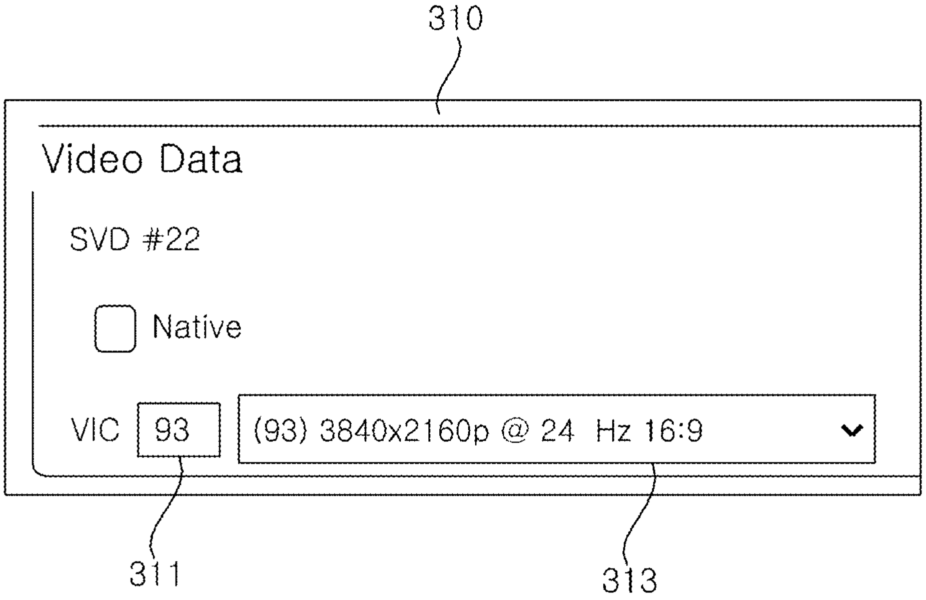
FIG. 3A is a diagram illustrating an example of Video Identification Code (VIC) information.
Figure 3B:
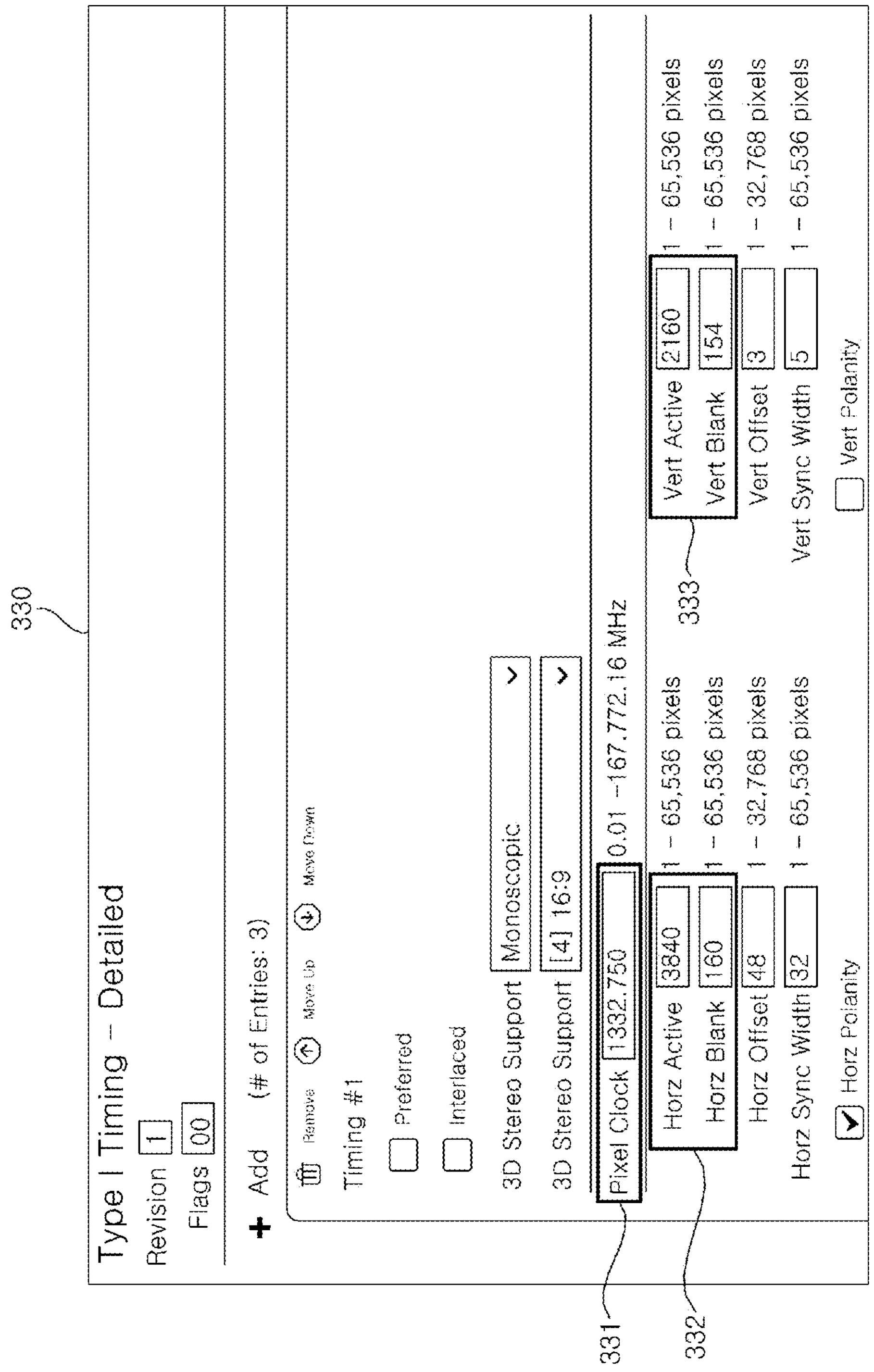
FIG. 3B is a diagram illustrating an example of Detailed Timing Descriptor (DTD) information.
Figure 3C:
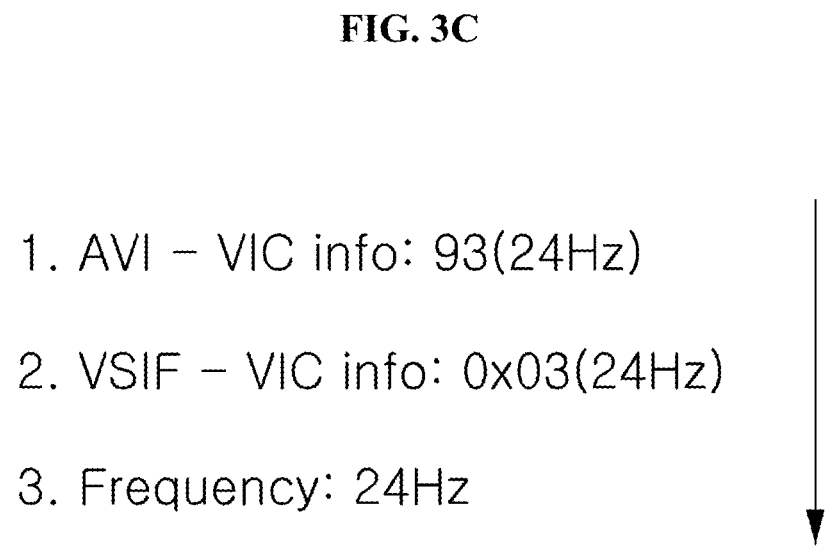

FIG. 3A is a diagram illustrating an example of Video Identification Code (VIC) information, FIG. 3B is a diagram illustrating an example of Detailed Timing Descriptor (DTD) information, and FIG. 3C is a diagram illustrating the sequence for confirming the output frequency of the video.

The VIC information 310 or DTD information 330 may be information included in extended display identification data (EDID) transmitted from the sink device 20 to the source device 10. EDID may include information about specification (eg, resolution, output frequency) supported by the sink device 20.

Referring to FIG. 3A, VIC information 310 includes an index 311 and video information 313.

The index 311 may be a number that identifies the resolution and output frequency of the VIC information 310.

Video information 313 may include resolution and output frequency (or frame rate) supported by the source device 10. For example, video information 313 whose index 311 is 93 may include a resolution of 3840×2160 and an output frequency of 24 Hz.

The sink device 20 may transmit an EDID containing a plurality of VIC information supported by the sink device 20 to the source device 10.

When receiving the index 311 included in the VIC information 310 from the source device 10, the sink device 20 may check the resolution and output frequency included in the VIC information 310 to output the video signal according to the resolution and output frequency.

Referring to FIG. 3B, DTD timing information 330 may include a pixel clock frequency 331, a horizontal total value 332, and a vertical total value 333. DTD timing information 330 may further include resolution.

The pixel clock frequency 331 may indicate the number of pixels that can be processed per second.

The horizontal total value 332 may be the total number of horizontal lines corresponding to the horizontal resolution of the screen. The horizontal total value 332 may include a horizontal active value corresponding to the area where the video is displayed and a horizontal blank value corresponding to the blank area.

The vertical total value 333 may be the total number of vertical lines corresponding to the vertical resolution of the screen. The vertical total value 333 may include a vertical active value corresponding to the area where the video is displayed and a vertical blank value corresponding to the blank area.

The sink device 20 may transmit an EDID containing a plurality of DTD information supported by the sink device 20 to the source device 10. The source device 10 may transmit a DTD timing signal having a resolution and output frequency corresponding to one of a plurality of DTD information to the sink device 20.

Referring to FIG. 3C, the sink device 20 may check the output frequency according to the following priority.

1. Check AVI (Auxiliary Video Information)-VIC to check output frequency
2. Check VSIF (Vendor Specific InfoFrame)-VIC to check output frequency
3. Calculate the output frequency of the video if there is no VIC That is, the sink device 20 may check VSIF-VIC if there is no AVI-VIC in the information received from the source device 10, and calculate the output frequency if there is no VSIF-VIC.

The case where there is no AVI-VIC or VSIF-VIC may mean that there is no index of VIC information.

The sink device 20 may calculate the output frequency using the video signal received from the source device 10. The video signal meant here may be referred to as VIC information or a DID timing signal without an index of VIC information.

When receiving the DTD timing signal, the sink device 20 does not know the video output frequency or pixel clock frequency, unlike when receiving the index of the VIC information 310.

The sink device 20 may calculate the output frequency of the video signal using three frames received from the source device 10. In particular, the sink device 20 may calculate the output frequency of the video signal using three frames received from the source device 10 after the stabilization period. The sink device 20 may may obtain, as the output frequency of the video signal, the average the first output frequency calculated through the first frame and the second frame among the sequentially received first to third frames and the second output frequency calculated through the second frame and the third frame.

In step 3, the sink device 20 can calculate not only the output frequency of the video but also the pixel clock frequency.

The sink device 20 may calculate the pixel clock frequency using the following

[Equation 1]

$$\text{Pixel clock frequency} = \text{output frequency} * (\text{horizontal total value} * \text{vertical total value})$$

The sink device 20 may calculate a horizontal total value corresponding to the number of horizontal lines and a vertical total value corresponding to the number of vertical lines based on the video signal received from the source device 10.

In this way, the sink device 20 first checks whether it receives VIC information from the source device 10, and if not, calculates the output frequency of the video through the DTD timing signal.

In this process, because of the time required to first check whether VIC information is received from the source device 10, the time required to calculate the output frequency and pixel clock frequency of the video signal, the video output is delayed for about 2 to 3 seconds. Additionally, if the calculated pixel clock frequency exceeds the allowable range, additional time may be required for recalculation.

In an embodiment of the present disclosure, when the sink device 20 receives a video signal that does not include an index of VIC information from the source device 10, it is intended to quickly obtain the output frequency of the video to eliminate video output delay.

Figures 4, 5:
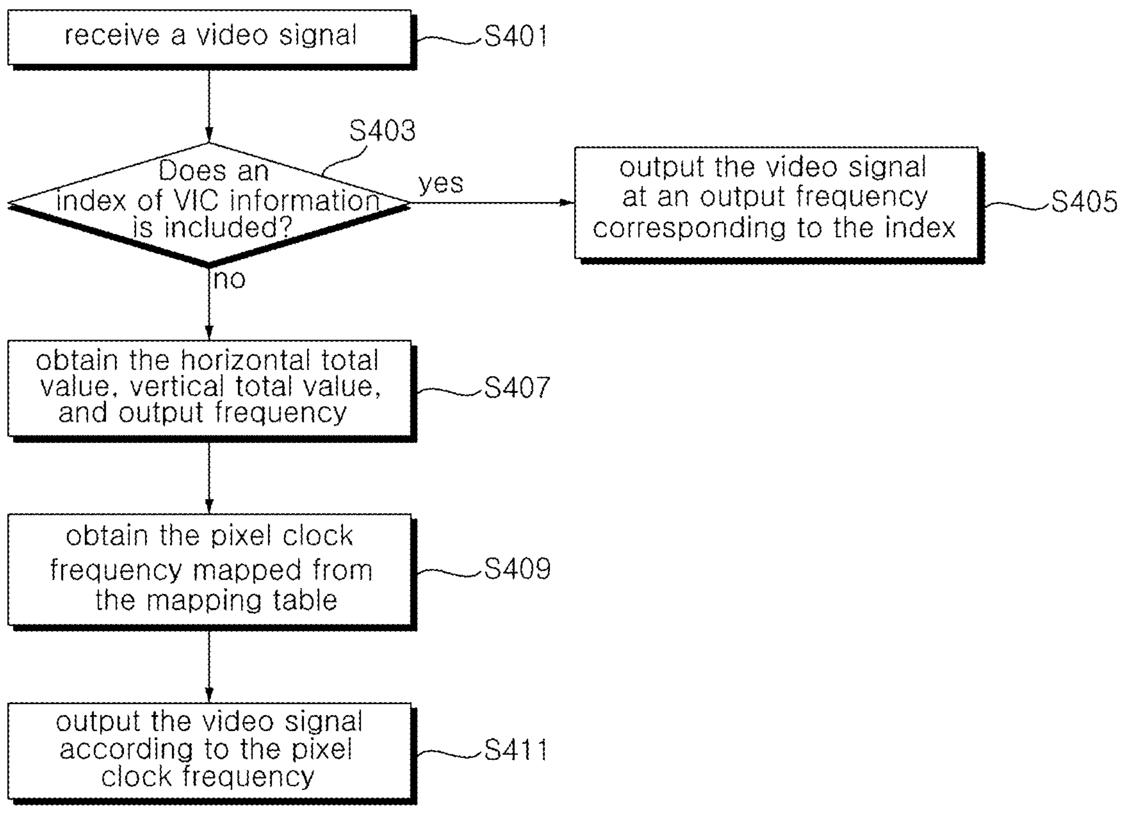
FIG. 4 is a flowchart illustrating a method of operating a sink device according to an embodiment of the present disclosure.
FIG. 5 is a diagram illustrating a mapping table according to an embodiment of the present disclosure.

FIG. 4 is a flowchart illustrating a method of operating a sink device according to an embodiment of the present disclosure.

Referring to FIG. 4, the controller 170 of the sink device 20 may receive a video signal from the source device 10 through the external device interface 135 (S401).

When connected to the HDMI terminal provided on the external device interface 135 of the sink device 20, the source device 10 may supply 5V power to the sink device 20 through a display data channel (DDC). When 5V power received from the source device 10 is supplied to the EDID (Extended Display Identification Data) circuit of the sink device 20, the sink device 20 may switch the HPD (Hot Plug Detect) signal from low to high.

The sink device 20 may transmit a connection confirmation signal (high signal) to the source device 10 as the HPD signal is switched from low to high.

When a high signal is received, the source device 10 may transmit a command requesting the EDID of the sink device 20 to the sink device 20 through DDC.

The sink device 20 may transmit the EDID of the sink device 20 through DDC according to the received command.

In one embodiment, the sink device 20 may receive a video signal from the source device 10 in response to transmission of the EDID. That is, the source device 10 may output, to the sink device 20, a video signal with the resolution and output frequency included in the EDID received from the sink device 20.

The controller 170 may determine whether the received video signal includes an index of VIC information (S403).

The controller 170 may determine whether the received video signal includes index information identifying VIC information. The controller 170 may determine whether an index of a video identification code (VIC) is received from the source device 10 in response to transmission of the EDID.

If the received video signal includes an index of VIC information, the controller 170) may output the video signal at an output frequency corresponding to the index (S405).

The controller 170 may obtain the resolution and output frequency corresponding to the index based on the VIC information included in the EDID stored in the memory 140.

For example, when the video signal includes the index number 93 of FIG. 3A, the controller 170 may parse the VIC information 310 matching 93. The controller 170 may output a video signal using the resolution and video output frequency included in the VIC information 310.

The controller 170 may control the display 180 to output a video signal according to the resolution and output frequency included in the VIC information 310.

If the received video signal does not include the index of VIC information, the controller 170 may obtain the horizontal total value, vertical total value, and output frequency based on the video signal (S407).

If the received video signal does not include the index of VIC information, the controller 170 may recognize the received video signal as a DTD timing signal.

The controller 170 may receive a video signal including one of an AVI packet or a VSIF packet including incidental information about the video from the source device 10 in response to transmission of the EDID. Additionally, the video signal may further include video data including information about the video to be output on the display 180.

AVI packets or VSIF packets may be transmitted to the sink device 20 separately from the video signal.

If the index of VIC information is not included in the AVI packet received from the source device 10 and the index of VIC information is not included in the VSIF packet, the controller 170 recognizes the received video signal as a DTD timing signal.

The controller 170 may calculate the horizontal total value using the horizontal synchronization signal frequency, the number of horizontal lines through which video displayed on the screen is output, and the interval of the horizontal synchronization signal. The controller 170 may sum the product of the horizontal synchronization signal frequency and the number of horizontal lines, and the interval of the horizontal synchronization signal and obtain the sum as the horizontal total value.

The controller 170 may calculate the vertical total value using the vertical synchronization signal frequency, the number of vertical lines through which video displayed on the screen is output, and the interval of the vertical synchronization signal. The controller 170 may sum the product of the vertical synchronization signal frequency and the number of vertical lines, and the interval of the vertical synchronization signal and obtain the sum as the vertical total value.

The controller 170 may obtain the pixel clock frequency mapped to the horizontal total value, the vertical total value and the output frequency from the mapping table stored in the memory 140 (S409).

In one embodiment, the mapping table may be a table that maps pixel clock frequency to horizontal total value, vertical total value, and output frequency.

FIG. 5 is a diagram illustrating a mapping table according to an embodiment of the present disclosure.

FIG. 5 may be a mapping table based on a resolution of 4K and an output frequency of 144 Hz.

Referring to FIG. 5, the mapping table 500 may be stored in the memory 140. The mapping table 500 may include a plurality of video information items. A plurality of video information items include index, pixel frequency (PCLK), horizontal total value (HTOTAL), vertical total value (VTOTAL), frame rate (or output frequency), tolerance frequency range (Tolerance), and pixel clock frequency tolerance range. (PCLK Tol).

The mapping table 500 is a table that maps index, pixel frequency (PCLK), horizontal total value (HTOTAL), vertical total value (VTOTAL), frame rate (or output frequency), tolerance frequency range (Tolerance), and pixel clock frequency tolerance range (PCLK Tol) to each other.

The index may be a number that identifies each video information item.

As another example, the mapping table 500 is a table that maps index, pixel frequency (PCLK), horizontal total value (HTOTAL), vertical total value (VTOTAL), frame rate (or output frequency), and pixel clock frequency tolerance range (PCLK Tol) to each other.

The controller 170 may calculate the horizontal total value, vertical total value, and frame rate based on the video signal received from the source device 10.

The controller 170 may extract the horizontal total value, vertical total value, and pixel clock frequency mapped to the frame rate from the mapping table 500.

For example, if the horizontal total value of the video signal received from the source device 10 is (3840+160), the vertical total value is (2160+154), and the frame rate is 144 Hz, the controller 170 may the pixel clock frequency as 1332.75 (MHz).

The controller 170 does not need to separately calculate the pixel clock frequency using the horizontal total value, vertical total value, and frame rate, but may obtain the pixel clock frequency (1332.75 (MHz)) mapped to the index (No. 1) of the horizontal total value, vertical total value and the frame rate.

As such, according to an embodiment of the present disclosure, if the time required to calculate the pixel clock frequency and the calculated pixel clock frequency exceeds the tolerance range, no time is required for recalculation.

The sink device 20 may quickly obtain the pixel clock frequency of the video through the mapping table 500 once only the horizontal total value, vertical total value, and frame rate are confirmed. Accordingly, the output delay time of the video received from the source device 10 may be greatly reduced.

Meanwhile, the controller 170 may obtain the pixel clock frequency through the mapping table 500 and then calculate the actual pixel clock frequency using the calculated horizontal total value, vertical total value, and frame rate.

If the calculated actual pixel clock frequency falls within the pixel clock frequency tolerance range corresponding to the corresponding index of the mapping table 500, the controller 170 may determines that the pixel clock frequency obtained through the mapping table 500 is a normal frequency. The controller 170 may output video at a later calculated actual pixel clock frequency.

Again, FIG. 4 will be described.

The controller 170 may output the video signal received from the source device 10 according to the pixel clock frequency (S411).

The controller 170 may control the display 180 so that the video signal received from the source device 10 is output according to the obtained pixel clock frequency.

The controller 170 may control the display 180 so that the video signal received from the source device 10 is output according to the obtained output frequency and pixel clock frequency.

The controller 170 may transmit the output frequency, pixel clock frequency, and video data to a timing controller (not shown) that controls the output timing of the display panel.

The timing controller may output video data to the display panel according to the output frequency and pixel clock frequency.

Figure 6A:
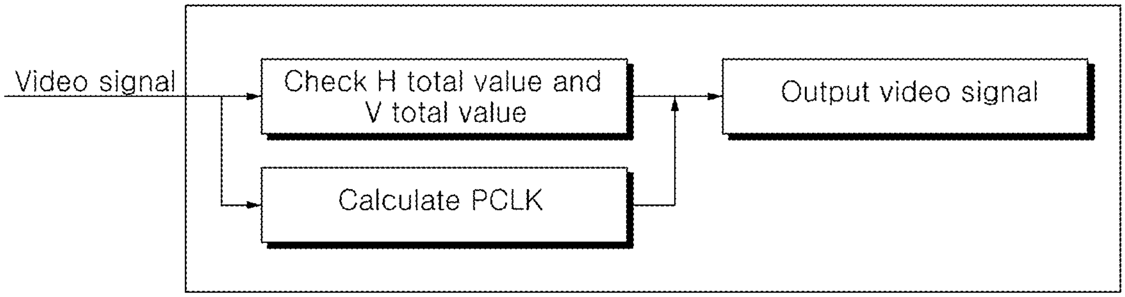
FIG. 6A is a diagram illustrating the process of calculating the pixel clock frequency according to the conventional method when a video signal that does not include an index of VIC information is input from a source device.
Figure 6B:
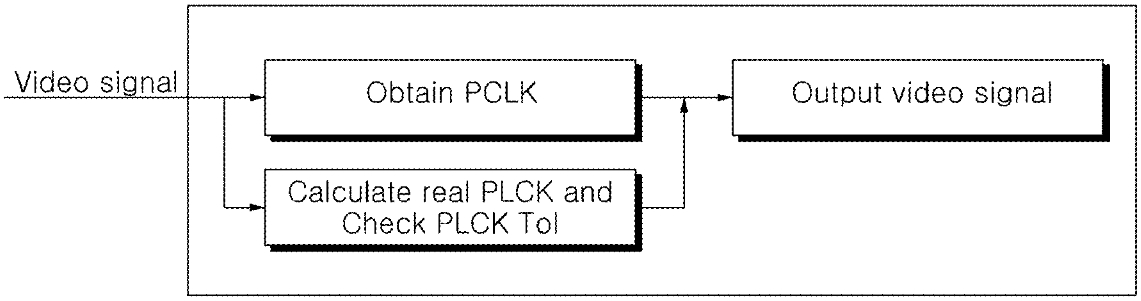
FIG. 6B is a diagram illustrating the process of calculating the pixel clock frequency according to an embodiment of the present disclosure when video that does not include an index of VIC information is input from a source device.

FIG. 6A is a diagram illustrating the process of calculating the pixel clock frequency according to the conventional method when a video signal that does not include an index of VIC information is input from a source device, and FIG. 6B is a diagram illustrating the process of calculating the pixel clock frequency according to an embodiment of the present disclosure when video that does not include an index of VIC information is input from a source device.

Referring to FIG. 6A, a conventional sink device calculates the horizontal total value, vertical total value, and frame rate based on the video signal received from the source device. A conventional sink device may calculate a pixel clock frequency (PLCK) using the calculated horizontal total value, vertical total value, and the frame rate, and output a video signal based on the calculated pixel clock frequency.

Referring to FIG. 6B, the sink device 20 according to an embodiment of the present disclosure may obtain the horizontal total value, vertical total value, and frame rate based on the received video signal. The sink device 20 may use the mapping table 500 to obtain the pixel clock frequency of the index mapped to the horizontal total value, vertical total value, and frame rate.

The sink device 20 may output a video signal to the display 180 based on the obtained pixel clock frequency.

The sink device 20 may calculate the actual pixel clock frequency (real PLCK) using the horizontal total value, vertical total value, and frame rate, and determine whether the calculated actual pixel clock frequency falls within the pixel clock frequency tolerance range.

As such, according to an embodiment of the present disclosure, when a video signal that does not include an index of VIC information is input from a source device, the pixel clock frequency is automatically extracted using the mapping table 500, so that time required for calculating the pixel clock frequency may be saved.

Accordingly, the output delay of the video signal may be minimized, thereby eliminating inconvenience in using the product.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage device.

The display device described above is not limited to the configuration and method of the above-described embodiments, and the embodiments may be configured by selectively combining all or part of each embodiment so that various modifications may be made.

What is claimed is:

1. A sink device, comprising:

a memory configured to store a mapping table;

an external device interface configured to receive a video signal from a source device through HDMI (High-Definition Multimedia Interface) standard; and a controller configured to:

obtain a horizontal total value, a vertical total value, and an output frequency based on the video signal, obtain a pixel clock frequency mapped to the horizontal total value, the vertical total value, and the output frequency from the mapping table, and output the video signal based on the obtained pixel clock frequency, wherein the mapping table is a table mapping an index of video identification code (VIC), the horizontal total value, the vertical total value, the output frequency, the pixel clock frequency, and a pixel clock frequency tolerance range.

2. The sink device of claim 1, wherein the controller is configured to calculate the horizontal total value, the vertical total value, and the output frequency based on the video signal if an index of video identification code (VIC) is not received from the source device.

3. A sink device, comprising:

a memory configured to store a mapping table;

an external device interface configured to receive a video signal from a source device through HDMI (High-Definition Multimedia Interface) standard; and a controller configured to:

obtain a horizontal total value, a vertical total value, and an output frequency based on the video signal, obtain a pixel clock frequency mapped to the horizontal total value, the vertical total value, and the output frequency from the mapping table, and output the video signal based on the obtained pixel clock frequency, wherein the mapping table is a table mapping the index, the horizontal total value, the vertical total value, and the output frequency, the pixel clock frequency, a tolerance frequency range, and a pixel clock frequency tolerance range.

4. The sink device of claim 1, wherein the controller is further configured to calculate an actual pixel clock frequency using the obtained horizontal total value, the vertical total value, and the output frequency after outputting the video signal based on the obtained pixel clock frequency.

5. The sink device of claim 1, wherein the controller is further configured to:

transmit Extended Display Identification Data (EDID) of the sink device to the source device, and determine whether or not an index of a video identification code (VIC) is received in response to transmission of the EDID.

6. The sink device of claim 1, wherein the controller is further configured to, when an index of a video identification code (VIC) is received from the source device, output the video signal at a resolution and a output frequency corresponding to the index.

7. The sink device of claim 1, further comprising a display configured to output a video, wherein the controller is configured to control the display to output the video signal according to the obtained pixel clock frequency.

8. An operating method of a sink device, comprising:

storing a mapping table;

receiving a video signal from a source device through High-Definition Multimedia Interface (HDMI) standard;

obtaining a horizontal total value, a vertical total value, and an output frequency based on the video signal;

obtaining a pixel clock frequency mapped to the horizontal total value, the vertical total value, and the output frequency from the mapping table, and outputting the video signal based on the obtained pixel clock frequency, wherein the mapping table is a table mapping an index of video identification code (VIC), the horizontal total value, the vertical total value, the output frequency, the pixel clock frequency, and a pixel clock frequency tolerance range.

9. The method of claim 8, wherein the obtaining the horizontal total value, the vertical total value and the output frequency step comprises:

calculating the horizontal total value, the vertical total value, and the output frequency based on the video signal if an index of video identification code (VIC) is not received from the source device.

10. The method of claim 8, wherein the mapping table further comprises a tolerance frequency range matched with the index, the horizontal total value, the vertical total value, and the output frequency, the pixel clock frequency, and the pixel clock frequency tolerance range.

11. The method of claim 8, further comprising:

calculating an actual pixel clock frequency using the obtained horizontal total value, the vertical total value, and the output frequency after outputting the video signal based on the obtained pixel clock frequency.

12. The method of claim 8, further comprising:

transmitting Extended Display Identification Data (EDID) of the sink device to the source device, and determining whether or not an index of a video identification code (VIC) is received in response to transmission of the EDID.

13. The method of claim 8, further comprising:

when an index of a video identification code (VIC) is received from the source device, outputting the video signal at a resolution and a output frequency corresponding to the index.

14. The method of claim 8, further comprising:

controlling a display of the sink device to output the video signal according to the obtained pixel clock frequency.

* * * * *